Figure 1:
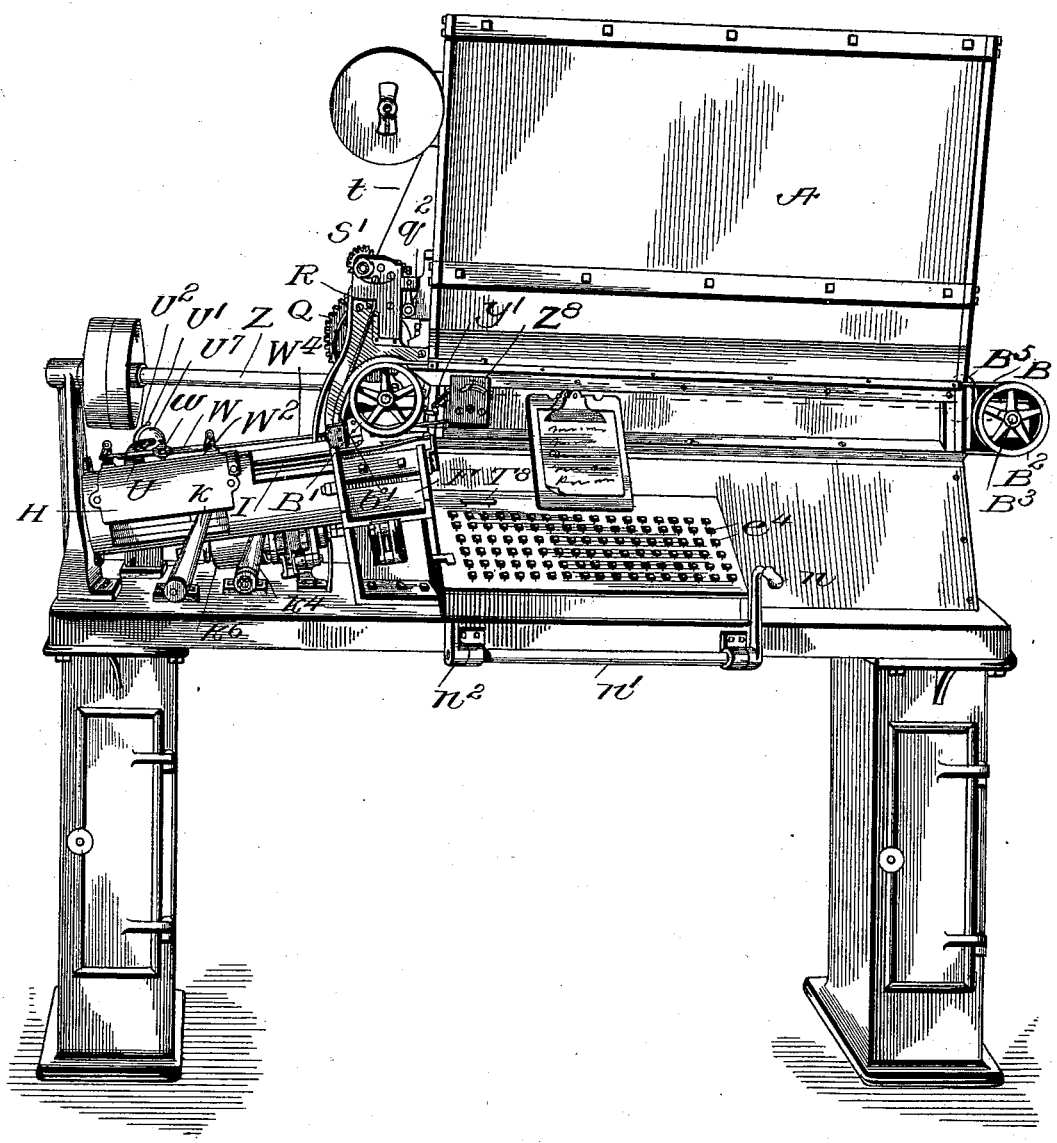

(No Model.)

P. F. COX.
TYPE SETTING MACHINE.

No. 601,498. Patented Mar. 29, 1898.

3 Sheets—Sheet 1.

Witnesses
Inventor
Paul F. Cox
by Alexander Bowell
his Attorneys

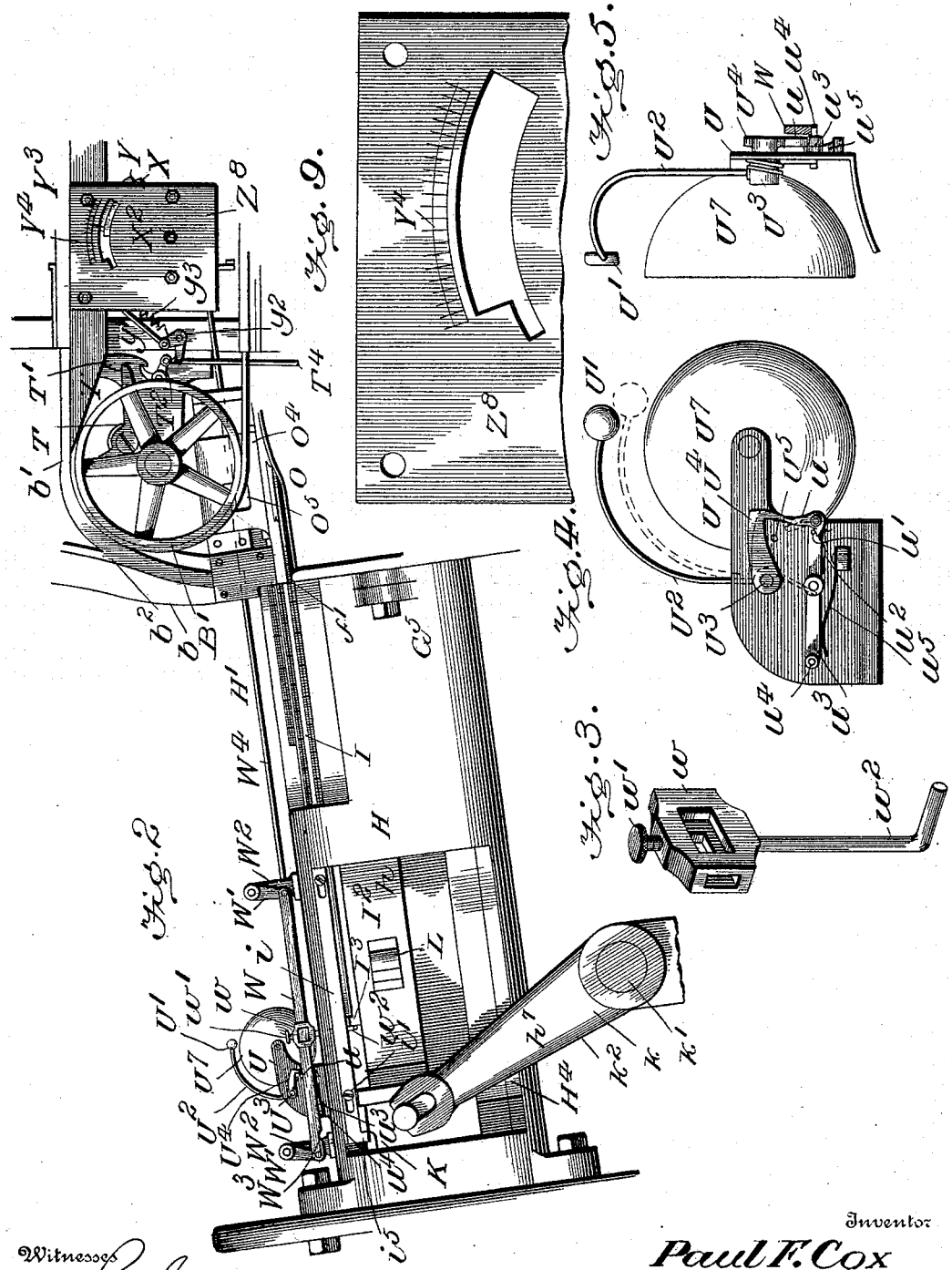

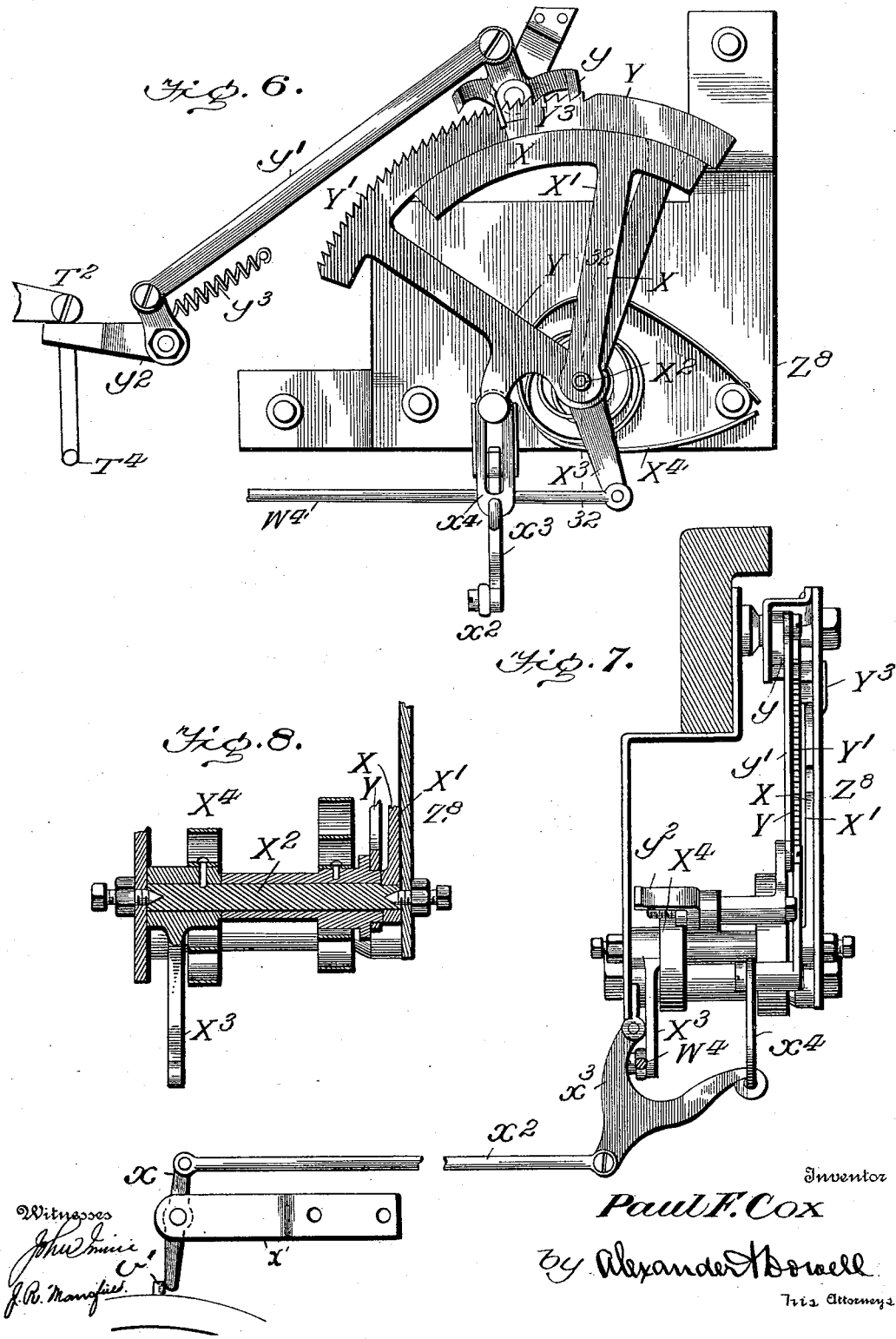

UNITED STATES PATENT OFFICE.

PAUL FLEMMING COX, OF CHICAGO, ILLINOIS, ASSIGNOR TO THE COX TYPE SETTING MACHINE COMPANY, OF SAME PLACE.

TYPE-SETTING MACHINE.

SPECIFICATION forming part of Letters Patent No. 601,498, dated March 29, 1898.

Application filed May 17, 1897. Renewed February 9, 1898. Serial No. 669,716. (No model.)

*To all whom it may concern:*

Be it known that I, PAUL FLEMMING COX, of Chicago, in the county of Cook and State of Illinois, have invented certain new and useful Improvements in Type-Setting Machines; and I hereby declare that the following is a full, clear, and exact description thereof, reference being had to the accompanying drawings, which form part of this specification.

This invention is an attachment for type-setting and similar machines, and relates especially to the type-setting machine shown and described in my Letters Patent No. 581,954, granted May 4, 1897.

The objects of this invention are to provide an improved means for sounding an alarm at or near the completion of a line or the assembling of enough type to constitute a line when justified; also, to provide a visual indicator which will show the operator how much the line is overset or how much it can be overset; also, to provide a visual indicator by which the operator can always see how many spaces have been introduced into the line, and thus on my said machine can know exactly whether the line of type he is setting can be properly justified, and can also see whether or not he can add another character or word to the line without destroying its capacity for justification.

I will describe my said improvements as applied to my said patented machine, and a clear understanding of the mode of operation of the latter will aid in comprehending the former; but I do not propose to explain my said machine herein, as it is fully explained in my aforesaid patent. I will only premise here that in said machine compressible spaces are employed, so that the line can be overset and subsequently justified by lineal compression thereof.

Like parts in the present drawings and in said patent are similarly lettered also.

In the accompanying drawings, Figure 1 is a perspective view of the complete machine with my improved attachments applied thereto. Fig. 2 is a detail front view of the setting and justifying mechanism of my said patent, showing the line-alarm and the operating mechanisms of the improvements more particularly. Fig. 3 is a detail view of the depending finger. Fig. 4 is a detail front elevation of the alarm and its operating mechanism; and Fig. 5 is an end view of the same, showing the movable bar in cross-section. Fig. 6 is an enlarged front view of the overset and space-indicating mechanism with the outer plate of the casing thereof removed, and Fig. 7 is an end view thereof. Fig. 8 is a section through the shaft $X^2$ and its connections, and Fig. 9 is a detail view of part of the front plate of the casing.

Referring to said drawings, A designates the type-reservoir; B, the type-carrier belt; F, the galley into which the justified lines of type are delivered.

I designates a rotary type-line receiver having a series of channels I', into which the types as composed are delivered. The types as they enter each channel force out a follower $I^2$ therein, which upon the completion of a line and after the receiver is shifted is pushed back, ejecting the line of type into galley F and justifying it by lineal compression. The plungers $I^2$ are then slightly retracted by a sliding plate $i$, as described in my aforesaid patent.

I will now proceed to describe my improvements.

*The line-alarm.*—Above and in rear of retractor-plate $i$ is a laterally-movable bar W, suspended at its ends by links W', pivoted to upstanding brackets $W^2$ on casing H, and on said bar is an adjustable collar $w$, which can be fixed by a set-screw $w'$ and has a depending finger $w^2$, which passes through a slot in casing H and is bent forward below retractor-plate $i$ into position to be struck by the end of a plunger $I^2$ as the same is pushed out of a channel I' by the incoming line of type.

In rear of bar W is a bracket U, on which is a gong $U^7$, and a hammer U' is mounted on the end of a spring-wire $U^2$, which is coiled around and secured on a rock-shaft $U^3$, journaled in bracket U and provided on its front end with a dog $U^4$, which dog when raised lifts the hammer away from the gong and tensions spring $U^2$. A stop-pin $U^5$ is attached to the bracket to arrest the drop of dog $U^4$ at such a point that the hammer will by momentum aided by the resiliency of the spring strike gong $U^7$ and then rebound, so as not to deaden its sound. Below dog $U^4$ is pivoted a lever $u^3$, on one end of which is pivoted a trip $u$, held at right angles to the lever by a spring $u^2$ and a stop-pin $u'$, and on the other end of lever $u^3$ is a pin $u^4$, which underlies and bears against under side of bar W, as shown. When bar W is in normal position, pin $u^4$ rests in a notch $W^3$ in the under side of the bar and trip $u$ underlies the tooth of dog $U^4$.

As the type are composed the plunger $I^2$ is pushed out, as described, toward finger $w^2$, and just as the line is completed the plunger strikes finger $w^2$ and pushes it back, thereby causing bar W to move rearwardly and pin $u^4$ to ride down out of notch $W^3$ and oscillate lever $u^3$. This movement of lever $u^3$ raises trip $u$, and the trip as it raises lifts dog $U^4$ momentarily and then disengages it, allowing the dog to drop, thus causing the hammer to strike the gong, as is evident. The sounding of the gong calls the attention of the compositor to the completion of the line. When the bar W is drawn back to normal position, as hereinafter described, upon the commencement of a new line, the pin $u^4$ is returned into notch $W^3$ by the action of a spring $u^5$, which pushes the rear end of lever $u^3$ upward, the trip $u$ yielding as it passes the tooth of the dog $U^4$, as will be evident from the drawings.

*The overset-indicator.*—Bar W is connected to an arm $X^3$ on a shaft $X^2$, carrying an indicator X, which indicates the amount of oversetting of a line and is contained in a small case $Z^8$, attached to the machine above the keyboard in convenient position to be observed. The indicator X has an arc-shaped head and a stem $X'$, which is keyed on one end of a shaft $X^2$, journaled in the front and rear plates of case $Z^8$, and on the other end of said shaft is a depending arm $X^3$, to which rod $W^4$ is pivoted, as shown, so that as bar W is swung rearward indicator X will be rocked and its head moved past an arc-shaped sight-opening in the front of case $Z^8$. A coiled spring $X^4$ is connected to shaft $X^2$, so as to return the indicator X and bar W to normal position upon the commencement of a new line.

*The space-indicator for lines.*—Within case $Z^8$ is a segment Y, mounted loosely on shaft $X^2$ in rear of indicator X. Said segment has a series of escapement-teeth $Y'$ on its periphery, which are engaged by an escapement-pawl $y$, which is pivoted on a suitable support just above the segment Y and is rocked by means of a rod $y'$, connecting it with one arm of a bell-crank $y^2$, which is pivoted beside and below dog $T^2$ with its free arm underlying said dog in position to be struck thereby, so that each time rod $T^4$ is depressed (whereby the space-making mechanism is put in operation and a space delivered to the composing mechanism) escapement-pawl $y$ is rocked and allows segment Y to be turned on its axis by a spring $Y^2$, connected thereto in such manner as to turn the segment in the same direction that indicator X is turned by the pull of bar W. A spring $y^3$ is used to pull crank $y^2$ and rod $y'$ upward.

An indicator $Y^3$ is attached to segment Y and projects through the sight-opening in the front of case $Z^8$ beside an index-scale $Y^4$ thereon.

To one side of segment Y is pivotally connected a slotted link $x^4$, which is also pivotally connected to one arm of a bell-crank lever $x^3$, fulcrumed at its bend, its other arm being connected by a rod $x^2$ to the upper end of a lever $x$, which is pivoted on a bracket $x'$, attached to the main frame at a suitable point, so that the lower end of lever $x$ stands in the path of the lug or pin $v'$, which controls latch V, (see my patent aforesaid,) so that lug $v'$ will also strike and oscillate lever $x$, and through its connections $x^2$ $x^3$ $x^4$ draw segment Y back to normal position.

Each time a space is delivered to the line being composed the indicator $Y^3$ is moved to the right, and the operator can at any time tell how many spaces are in the line. When the line is about complete, the indicator X begins to move, following up the space-indicator, and after the bell rings the operator may continue to set type until the indicator X catches up with the space-indicator $Y^3$, for up to that time there will be enough compressible spaces in the line to admit of its justification by lineal compression, as described in my patent aforesaid.

Obviously the improvements can be adapted to other machines than my own, and while especially designed for use in connection with the latter I do not confine myself thereto.

Having thus described my invention, what I therefore claim as new, and desire to secure by Letters Patent thereon, is—

1. In a line-alarm, the combination of the gong, the hammer, the rock-shaft supporting the hammer, and the dog thereon, the oscillating lever provided with a trip on one end adapted to engage the dog and lift and release it when the lever is oscillated; with a movable bar adapted to keep down the free end of the lever until the line is completed, substantially as and for the purpose described.

2. In a line-alarm the combination of the notched movable bar W, an oscillating lever $u^3$ having one end underlying said bar, and a trip $u$ on its other end; with a gong, a spring-supported hammer $U'$ fastened to a rock-shaft, and a dog $U^4$ on said rock-shaft adapted to be engaged by said trip, all substantially as and for the purpose set forth.

3. The combination with the composing mechanism of a type-setting or similar machine, of a rod, mechanism for pulling said rod upon the completion of a line, and a rock-shaft $X^2$ connected to said rod; with an overset-indicator segment X on said rock-shaft, and means for returning said segment and shaft to normal position, all substantially as and for the purpose described.

4. The combination of the plunger $I^2$, bar W, finger $W^2$, and rod $W^4$; with the overset-indicator X connected to and operated by rod $W^4$, all substantially as and for the purpose described.

5. The combination with the space mechanism of a type-setting or similar machine; of an indicator and means for moving said indicator step by step, adapted to be released by the depression of the space-key, all substantially as and for the purpose set forth.

6. The combination with the space-releasing key of a type-setting or similar machine, of a space-indicator, consisting of an oscillating segment as Y provided with ratchet-teeth, an escapement-pawl engaging the teeth of the segment, connections for oscillating said escapement upon the depression of the space-key, and means for returning the indicator to normal position, substantially as and for the purpose described.

7. The combination with the overset-indicator of a type-setting or similar machine, and its operating mechanism, substantially as described, of a space-indicator beside the overset-indicator, and mechanism for operating said space-indicator from the space-controlling key, whereby the amount of overset of the lines, and the number of spaces in the lines and the possibility of justification of such line can be determined at a glance, all substantially as and for the purpose set forth.

8. The combination with the type-line receiver, the finger $w^2$ adapted to be engaged by the follower, and the rod $W^4$ shifted by the movement of said finger; and the space-controlling key, rod $T^4$, and trip $T^2$, substantially as described; with the overset-indicator segments X mounted on a shaft $X^2$ which is connected by an arm $X^3$ to rod $W^4$, the space-indicator segment Y loosely mounted on shaft $X^2$, having ratchet-teeth $Y'$, the escapement-lever $y$, rod $y'$ and trip $y^2$, whereby the movement of segment Y is controlled by the movement of rod $T^4$; all constructed and arranged so as to enable the amount of overset of line, the number of spaces therein, and the possibility of justification thereof to be determined at a glance, substantially as specified.

In testimony that I claim the foregoing as my own I affix my signature in presence of two witnesses.

PAUL FLEMMING COX.

Witnesses:
ORVILLE D. ORTON,
JAS. A. WOOD.